(No Model.)
H. R. TOWNE.
Lock Cylinder.
No. 234,630.  Patented Nov. 16, 1880.
Fig. 1.
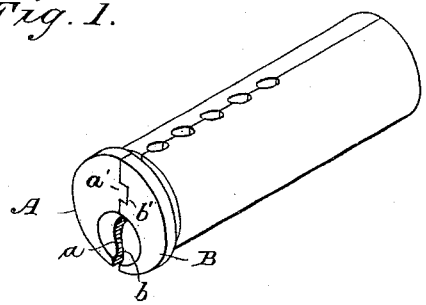
Fig. 2.
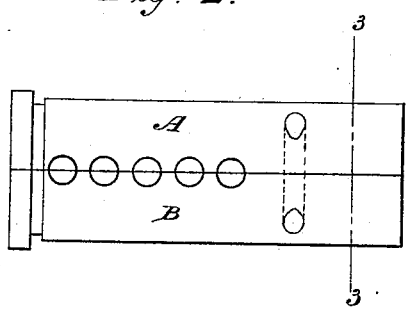
Fig. 3.  Fig. 4.
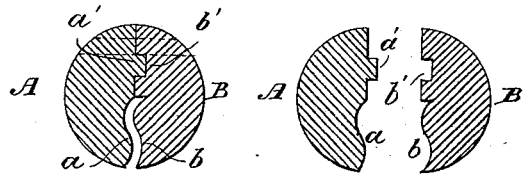
Fig. 7.  Fig. 6.
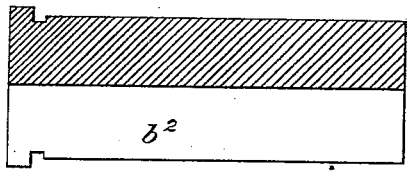  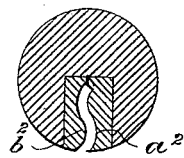
Fig. 5.
WITNESSES  INVENTOR
Wm. A. Skinkle  Henry R. Towne.
Chas. H. Baker  By his Attorneys
  Baldwin, Hopkins, & Peyton.

UNITED STATES PATENT OFFICE.

HENRY R. TOWNE, OF STAMFORD, CONNECTICUT.

LOCK-CYLINDER.

SPECIFICATION forming part of Letters Patent No. 234,630, dated November 16, 1880.

Application filed June 12, 1880. (No model.)

*To all whom it may concern:*

Be it known that I, HENRY R. TOWNE, of Stamford, in the county of Fairfield and State of Connecticut, have invented an Improvement in Lock Hubs or Cylinders, of which the following is a specification.

The object of my invention is to improve that form of key-hub or cylinder which is provided with a curved or sinuous slot for the reception of a longitudinally grooved or corrugated sheet-metal key having side bits or serrations like the well-known "Security" Yale lock-key.

I form my hub of two semi-cylindrical parts suitably shaped on their contiguous faces, and united so as to leave an open slot of the desired contour between the parts running through the length of the hub and extending from about its center to its circumference.

In the accompanying drawings, Figure 1 is a perspective view of my key-hub; Fig. 2, a side elevation of the same; Fig. 3, a cross-section through the line $x\ x$ of Fig. 2, showing the parts united; Fig. 4, a similar cross-section, showing the parts a little separated. Fig. 5 represents, for purposes of illustration, a corrugated key adapted to fit the slots shown in other figures; and Figs. 6 and 7 illustrate an alternate mode of constructing a hub on the same general principle.

A indicates one half the hub, cut away at $a$ to form one wall of the key-slot, and provided with a tongue, $a'$. B indicates the other half, cut away at $b$ to form another wall of the key-slot, and provided with a groove, $b'$, corresponding to the tongue $a'$. These semi-cylindrical parts may be formed by casting, drawing through dies, stamping, milling, or cutting, as is well understood by metal-workers.

The tongue and groove may be dispensed with, if preferred, and the parts may be united by rivets, dowel-pins, soldering, or otherwise, or each half might be correspondingly grooved, and, when brought together, a feather or key might be inserted in the grooves to join the parts.

The mechanical method of forming the separate parts, or the particular contours of the slots produced, which may be varied without limit, or the means of fastening the parts together after they are suitably formed, are not material to my invention, and are not features of it; nor is it absolutely essential that the cylinder itself be composed of two united halves; but the material thing in my invention, broadly defined, is the formation of an irregular sinuous or curved longitudinal slot in a key-hub by the union or contiguity of two corresponding parts. Hence I might take a solid cylinder suitable for a key-hub and cut a rectangular longitudinal groove in it, as shown in Fig. 6, and place within the groove on its opposite sides corresponding face-pieces $a^2$ and $b^2$, as shown in Fig. 6, to form the key-slot; but this is not the preferable way of carrying out my invention, and I only describe and illustrate it as an example of variation in the process of manufacture that may be resorted to, if desirable in any case, without departing from the principle of my invention.

What I claim as my invention, and desire to secure by Letters Patent, is—

A key hub or cylinder having a sinuous longitudinal key-slot formed of two correspondingly-faced parts placed contiguous to each other, substantially as described.

In testimony whereof I hereunto subscribe my name.

HENRY R. TOWNE.

Witnesses:
GEO. E. WHITE,
SCHUYLER MERRITT.